United States Patent
Rochford et al.

(10) Patent No.: US 10,163,198 B2
(45) Date of Patent: Dec. 25, 2018

(54) PORTABLE IMAGE DEVICE FOR SIMULATING INTERACTION WITH ELECTRONIC DEVICE

(71) Applicant: Samsung Electronics Co., Ltd., Suwon-si, Gyeonggi-do (KR)

(72) Inventors: Ciaran Rochford, Mountain View, CA (US); Xiaoguang Li, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/054,536

(22) Filed: Feb. 26, 2016

(65) Prior Publication Data

US 2017/0249726 A1 Aug. 31, 2017

(51) Int. Cl.
*G06T 19/00* (2011.01)
*G06K 9/00* (2006.01)
*G06F 3/0482* (2013.01)
*G06T 5/50* (2006.01)

(52) U.S. Cl.
CPC ............ *G06T 5/50* (2013.01); *G06K 9/00671* (2013.01); *G06T 19/006* (2013.01); *G06F 3/0482* (2013.01); *G06T 2207/20221* (2013.01)

(58) Field of Classification Search
CPC ......... G06T 19/006; G06T 2207/20221; G06F 3/048; G06K 9/00671; G06K 9/00664
USPC .......................... 345/619, 418, 7, 8, 629–635
See application file for complete search history.

(56) References Cited

U.S. PATENT DOCUMENTS

| | | | |
|---|---|---|---|
| 7,620,894 B1 | 11/2009 | Kahn | |
| 9,001,006 B2 | 4/2015 | Yu et al. | |
| 9,058,764 B1 | 6/2015 | Persson et al. | |
| 2008/0266323 A1 | 10/2008 | Biocca et al. | |
| 2008/0307361 A1 | 12/2008 | Louch et al. | |
| 2010/0164990 A1 | 7/2010 | Van Doorn | |
| 2013/0069985 A1* | 3/2013 | Wong | G02B 27/017 345/633 |
| 2013/0300637 A1 | 11/2013 | Smits et al. | |
| 2014/0002329 A1 | 1/2014 | Nishimaki et al. | |
| 2014/0285404 A1* | 9/2014 | Takano | G06F 3/005 345/8 |
| 2014/0340424 A1 | 11/2014 | Ellsworth | |
| 2015/0062161 A1 | 3/2015 | Kim et al. | |
| 2015/0062162 A1 | 3/2015 | Kim et al. | |
| 2015/0084857 A1* | 3/2015 | Kimura | G06F 3/03 345/156 |
| 2015/0089453 A1 | 3/2015 | Dal Mutto et al. | |
| 2015/0153571 A1 | 6/2015 | Ballard et al. | |
| 2015/0170419 A1 | 6/2015 | Ohashi | |

(Continued)

FOREIGN PATENT DOCUMENTS

WO 2014/209772 A1 12/2014

*Primary Examiner* — Chante Harrison
(74) *Attorney, Agent, or Firm* — Jefferson IP Law, LLP

(57) ABSTRACT

An apparatus and a method for displaying an image on a portable image device are provided. The method includes receiving a first input from an object detection device, the first input being an indication that a marker associated with an object is detected, determining a configuration of the object based on the first input, generating a first image corresponding to the object based on the configuration of the object, and displaying the first image on an image display device of the portable image device.

12 Claims, 9 Drawing Sheets

(56) References Cited

U.S. PATENT DOCUMENTS

| | | | |
|---|---|---|---|
| 2015/0205351 A1* | 7/2015 | Osterhout | G06F 3/012 345/156 |
| 2015/0228122 A1* | 8/2015 | Sadasue | G06T 19/006 345/633 |
| 2015/0235426 A1* | 8/2015 | Lyons | G02B 27/0172 345/8 |
| 2015/0269783 A1* | 9/2015 | Yun | G02B 27/0172 345/633 |
| 2016/0026253 A1* | 1/2016 | Bradski | G02B 27/225 345/8 |
| 2016/0093107 A1* | 3/2016 | Yamamoto | A63F 13/92 3/92 |
| 2016/0133052 A1* | 5/2016 | Choi | G06T 19/006 345/633 |

\* cited by examiner

PORTABLE IMAGE DEVICE FOR SIMULATING INTERACTION WITH ELECTRONIC DEVICE

TECHNICAL FIELD

The present disclosure relates to an apparatus and method for simulating interaction with an electronic device using a portable image device. More particularly, the present disclosure relates to an apparatus and method for projecting a simulated image of a portable electronic device interface using a portable image device.

BACKGROUND

A user may have multiple portable electronic devices capable of performing the same or substantially similar operations. For example, a user may have a portable image device, a smart phone, a tablet, and/or a wearable device such as a smart watch where each of the portable electronic devices may be configured to perform one or more operations such as sending and receiving a telephone call, sending and receiving data including short message service (SMS)/multimedia message service (MMS) messages, email, audio, video, etc., scheduling or calendar functions, an alarm function, etc.

Since each portable electronic device may perform a plurality of operations, a user generally performs multiple operations with a single device while the capabilities of performing that same operation with the other portable electronic devices are not utilized.

Accordingly, there is a need for simulating an interaction with one or more portable electronic devices to reduce undesirable technology redundancy.

SUMMARY

Aspects of the present disclosure are to address at least the above-mentioned problems and/or disadvantages and to provide at least the advantages described below. Accordingly, an aspect of the present disclosure is to provide an apparatus and method for simulating interaction with an electronic device using a portable image device.

In accordance with an aspect of the present disclosure, a portable image device is provided. The portable image device includes an object detection device, an image display device, and a controller configured to receive a first input from the object detection device, the first input being an indication that a marker associated with an object is detected, determine a configuration of the object based on the first input, generate a first image corresponding to the object based on the configuration of the object, and display the first image on the image display device.

In accordance with another aspect of the present disclosure, a method of displaying an image on a portable image device is provided. The method includes receiving a first input from an object detection device, the first input being an indication that a marker associated with an object is detected, determining a configuration of the object based on the first input, generating a first image corresponding to the object based on the configuration of the object, and displaying the first image on an image display device of the portable image device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
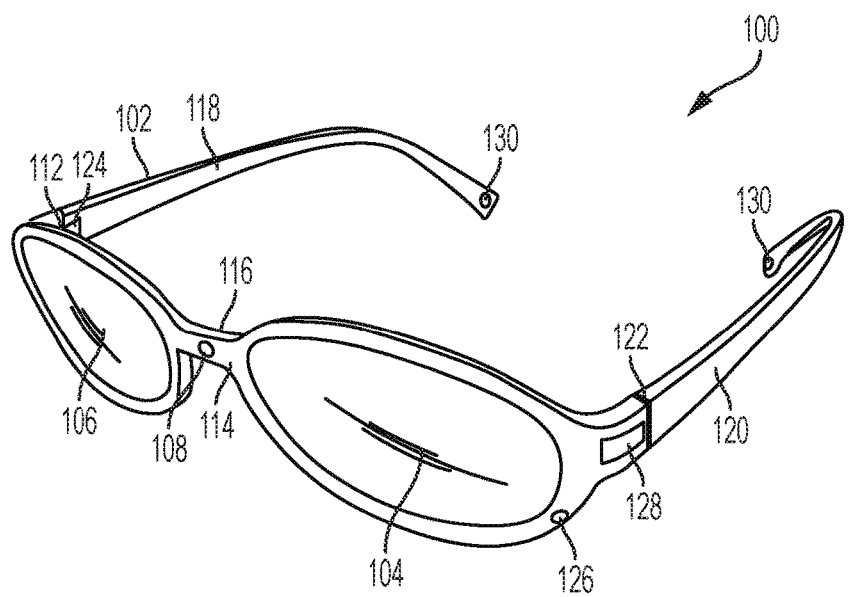
FIG. 1 illustrates a front perspective view of a portable image device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., SAMSUNG HOMESYNC, APPLE TV, or GOOGLE TV), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for simulating interaction with an electronic device using a portable image device.

Figure 2:
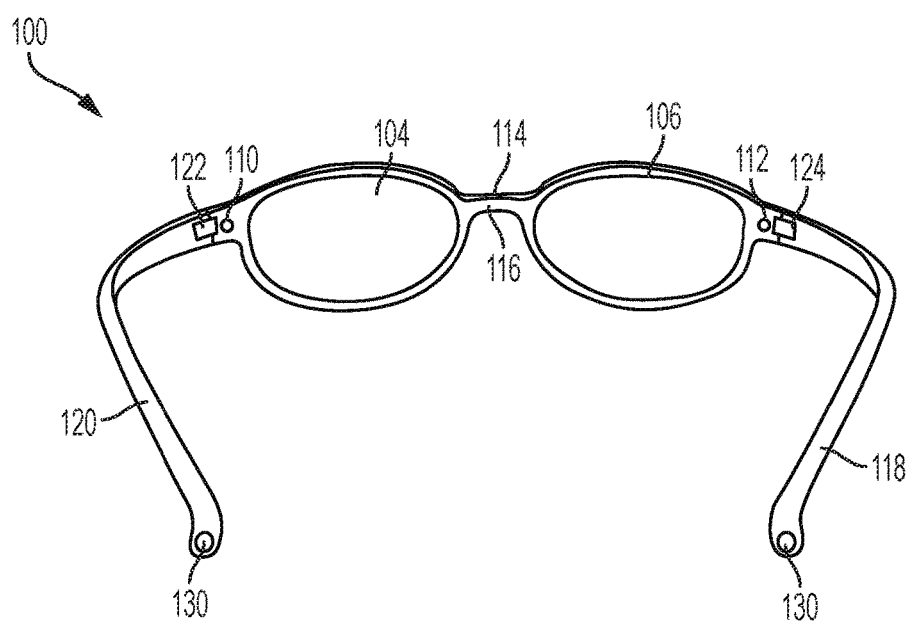
FIG. 2 illustrates a rear perspective view of the portable image device according to various embodiments of the present disclosure.

FIG. 1 illustrates a front perspective view of a portable image device according to various embodiments of the present disclosure. FIG. 2 illustrates a rear perspective view of the portable image device according to various embodiments of the present disclosure.

Referring to FIG. 1, a portable image device 100 is configured to display an image to be viewed by a single user. The portable image device 100 may be any type of portable image device such as a heads-up display or a head-mounted display (HMD). For instance, the portable image device 100 may include glasses, goggles, or a helmet worn on the head of a user. In an exemplary embodiment, as illustrated in FIG. 1, the portable image device 100 may be a heads-up display that displays an image on, in, or through a transparent display where the image is superimposed over a current viewpoint which allows for simultaneous viewing of the image and the current surroundings.

Referring to FIGS. 1 and 2, the portable image device 100 may include a housing 102, a first transparent display 104, a second transparent display 106, an image capture device 108, a first projection device 110, and a second projection device 112. In an exemplary embodiment, the portable image device 100 may further include at least one of an input device and an output device. While the portable image device 100 is shown as having a configuration as illustrated in FIGS. 1 and 2, one of ordinary skill in the art would recognize that the portable image device 100 may have any configuration including size, shape, arrangement, and/or orientation.

The housing 102 may include a front frame 114, a rear frame 116, a first support 118, and a second support 120. In an exemplary embodiment, the first support 118 and the second support 120 may be pivotally mounted to the housing 102 by hinges 122 and 124, respectively. However, the first support 118 and the second support 120 may be secured to the housing 102 in any manner. The housing 102 may include various types of materials including glass, plastic, metal, and a combination thereof.

The first transparent display 104 and the second transparent display 106 are configured to display an image. For example, the first projection device 110 may project a first image onto the first transparent display 104 and the second projection device 112 may project a second image onto the second transparent display 106. In an exemplary embodiment, the first image and the second image may be displayed to create a stereographic image or a three-dimensional image. The first transparent display 104 and the second transparent display 106 may be made of any transparent material including glass, plastic, etc.

The image capture device 108 is configured to capture an image. For example, the image capture device 108 may capture an image external to the portable image device 100 such as within the surrounding environment of the portable image device 100. The image capture device 108 may capture an image that is within the line of sight of a user of the portable image device 100. Alternatively, the image capture device 108 may capture an image which a user is unable to see within a direct line of sight.

The image capture device 108 may include one or more cameras. As illustrated in FIG. 1, a single image capture device 108 is arranged in the housing 102 between the first transparent display 104 and the second transparent display 106. However, one or more the image capture devices 108 may be arranged in any position on the front frame 104. For instance, an image capture device 108 may be arranged above, below, to the left and/or to the right of the first transparent display 104 and/or the second transparent display 106. The image capture device 108 may be any type of capture device including an infrared camera, a red-green-blue (RGB) camera, a combination thereof, etc.

In addition, the portable image device 100 may further include one or more image capture devices (not illustrated) disposed on the rear frame 116 of the housing 102 where the image capture devices disposed on the rear frame 116 are orientated to capture images associated with the user such as for eye-tracking techniques, etc.

The first projection device 110 and the second projection device 112 are configured to project images onto the first transparent display 104 and the second transparent display 106, respectively. The first projection device 110 and the second projection device 112 may be disposed within the housing 102 where the light is projected through an opening formed in the housing 102 or the first projection device 110 and the second projection device 112 may be disposed on a surface of the housing 102.

In an exemplary embodiment, the portable image device 100 can further include at least one of an input device and/or an output device. For example, the input device can include one or more input devices such as a microphone 126 configured to generate an electrical signal from a sound wave where the electrical signal indicates an input from a user and at least one button 128 configured to receive a tactile input from a user. The at least one button 128 may include one or more touch sensors configured to operate as a power button, a volume button, a menu button, a home button, a back button, navigation buttons (e.g., left button, right button, up button, down button, etc.), and/or a combination thereof. The output device may include one or more output devices such as an audio output device 130 (e.g., a speaker) configured to output sound associated with the portable image device 100 and a vibration output device (not illustrated).

As illustrated in FIGS. 1 and 2, the input device and/or the output device may be integrally formed with the portable image device 100. For example, the at least one button 128 may be disposed on the housing 102 of the portable image device 100. In addition, the microphone 126 may be integrally formed with the housing 120 of the portable image device 100. Alternatively, the input device and/or the output device may be separate from the housing 102. For example, the microphone 126 may be a separate device from the portable image device 100 where the microphone 126 and the portable image device 100 are in communication to allow the portable image device 100 to communicate with the microphone 126.

In an exemplary embodiment, the portable image device 100 may further include one or more sensors (not illustrated) configured to detect a state or surrounding environment of the portable image device 100. For example, the one or more sensors may detect a state or surrounding environment condition of the portable image device 100 and transmit a signal to a controller of the portable image device 100.

The one or more sensors may include at least one of a proximity sensor for detecting the proximity of an object to the portable image device 100, a motion/orientation sensor for detecting a motion or orientation (e.g., rotation, acceleration, deceleration, and vibration) of the portable image device 100, an illumination sensor for detecting ambient illumination in the surrounding environment of the portable image device 100, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor. In addition, the portable image device 100 can include a magnetic ink detection sensor.

Figure 3:
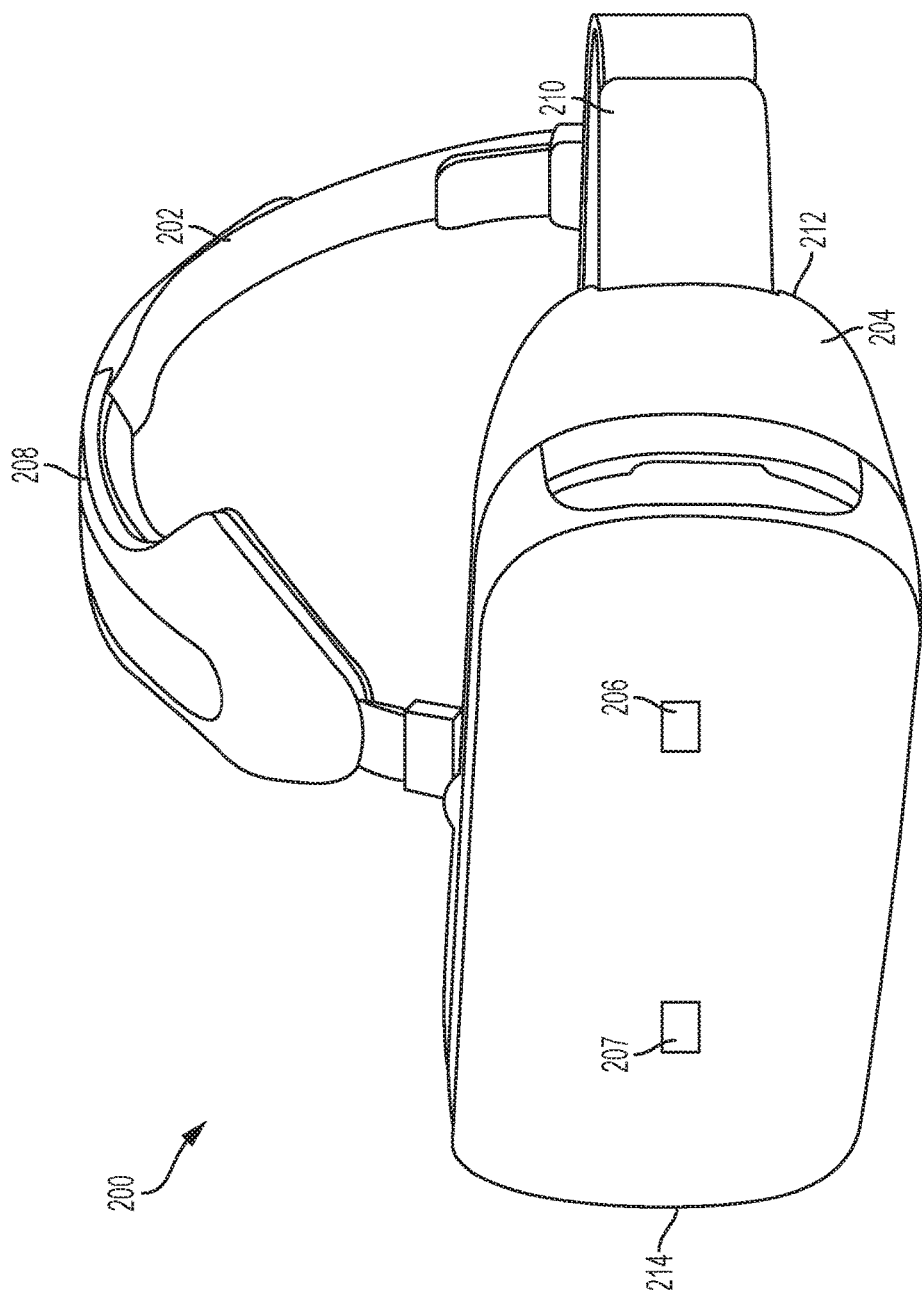
FIG. 3 illustrates a front perspective view of another portable image device according to various embodiments of the present disclosure.

FIG. 3 illustrates a front perspective view of another portable image device according to various embodiments of the present disclosure.

Referring to FIG. 3, a portable image device 200 is a head mounted display configured to display an image to a user. In an exemplary embodiment, the portable image device 200 may be used in an alternative reality (AR) environment and/or a virtual reality (VR) environment. The portable image device 200 may include a support 202, a housing 204, a first image capture device 206, and a second image capture device 207.

The support 202 is configured to secure the portable image device 200 to a user. For example, the support 202 allows the portable image device 200 to be worn and removably coupled to a user. The support 202 may include a head support 208 and/or a strap 210. While FIG. 3 illustrates both the head support 208 and the strap 210, one of ordinary skill in the art would recognize that the portable image device 200 can include one or more support elements where the support elements may have the same or different configurations.

The housing 204 may include a first surface 212 and a second surface 214. In an exemplary embodiment, the first surface 212 may be arranged on an inner portion of the housing 204 such that a portion of the first surface 212 may come in contact with the user's face. For instance, at least a portion of the first surface 212 may come in close contact with the user's face (e.g., around the eyes) where the portion of the first surface 212 may be supported on the user's face. The second surface 214 may be positioned on an external portion of the housing such that the second surface 214 is positioned away from the user's face.

The first image capture device 206 and the second image capture device 207 are configured to capture an image. For example, the first image capture device 206 and the second image capture device 207 may capture images external to the portable image device 200 such as within the surrounding environment of the portable image device 200.

The first image capture device 206 and the second image capture device 207 may be any type of image capture device. For example, the first image capture device 206 or the second image capture device 207 may be an infrared camera, an RGB camera, a combination thereof, etc. In addition, the first image capture device 206 and the second image capture device 207 may be the same type of image capture device or a different type of capture device.

As illustrated in FIG. 3, portable image device 200 includes two image capture devices 206 and 207. However, portable image device 200 may include one or more image capture devices. Each image capture device may be arranged in any position and/or configuration with respect to housing 204. In addition, the first image capture device 206 and/or the second image capture device 207 may be oriented at various angles to capture images of the surrounding environment of the portable image device 200 from various points of view. For example, the first image capture device 206 and/or the second image capture device 207 may be arranged and oriented in substantially the same position as the user's eyes in order to capture images in a line of sight similar to that of the user when the portable image device 200 is not supported on the user's head. In addition, the first image capture device 206 and/or the second image capture device 207 may be alternatively or additionally arranged and oriented to capture images outside the user's line of sight.

In an exemplary embodiment, a display (not illustrated) configured to display an image may be disposed within the housing 204. The display may be a single display or a plurality of displays configured to display an image to the user. For example, the display may operate in various modes to generate two-dimensional or three-dimensional images. For example, the display may include at least one of a display panel, a lens, a laser, and a projector to create a two-dimensional or three-dimensional image including holograms to be viewed by the user.

The first image capture device 206 and the second image capture device 207 may be used to capture images that create stereo images to be displayed to the user on the display disposed within the housing 204. For example, referring to FIG. 3, the first image capture device 206 may have a focal point associated with a left eye of the user and the second image capture device 207 may have a focal point associated with the right eye of the user where the first image capture device 206 and the second image capture device 207 are arranged an eye width apart to capture two different images. The images captured by the first image capture device 206 and the second image capture device 207 may be processed to create a three-dimensional and/or stereo image.

In an exemplary embodiment, the portable image device 200 may further include one or more image capture devices (not illustrated) disposed within the housing 204 where the image capture devices disposed within the housing 204 are orientated to capture images associated with the user such as for eye-tracking techniques, etc.

While not illustrated in FIG. 3, portable image device 200 may further include at least one of an input device and/or an output device. For example, the input device can include one or more input devices such as a microphone configured to generate an electrical signal from a sound wave where the electrical signal indicates an input from a user and at least one button configured to receive a tactile input from a user. The at least one button may include one or more touch sensors configured to operate as a power button, a volume button, a menu button, a home button, a back button, navigation buttons (e.g., left button, right button, up button, down button, etc.), and/or a combination thereof. The output device may include one or more output devices such as an audio output device (e.g., a speaker) configured to output sound and a vibration output device.

The input device and/or the output device may be integrally formed with the portable image device 200. For example, the at least one button may be disposed on the housing 204 of the portable image device 200. In addition, the microphone may be integrally formed with the housing 204 of the portable image device 200. Alternatively, the input device and/or the output device may be separate from the housing 204. For example, the microphone may be a separate device from the portable image device 200 where the microphone and the portable image device 200 are in communication to allow the portable image device 200 to communicate with the microphone.

In an exemplary embodiment, the portable image device 200 may also further include one or more sensors (not illustrated) configured to detect a state or surrounding environment of the portable image device 200. For example, the one or more sensors may detect a state or surrounding environment condition of the portable image device 200 and transmit a signal to a controller of the portable image device 200.

The one or more sensors may include at least one of a proximity sensor for detecting the proximity of an object to the portable image device 200, a motion/orientation sensor for detecting a motion or orientation (e.g., rotation, acceleration, deceleration, and vibration) of the portable image device 200, an illumination sensor for detecting ambient illumination in the surrounding environment of the portable image device 200, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor. In addition, the portable image device 200 can include a magnetic ink detection sensor.

Figure 4:
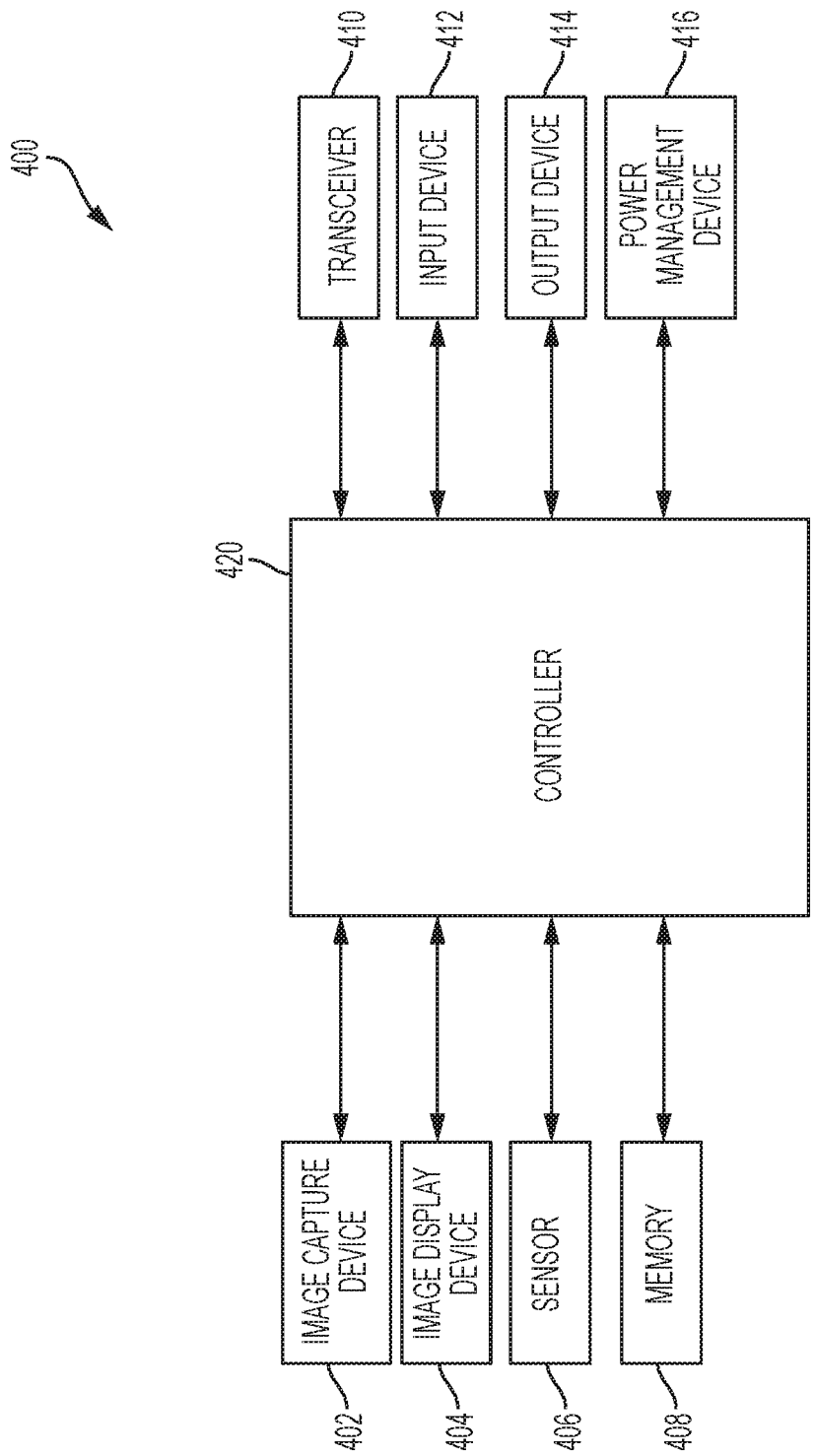
FIG. 4 is a block diagram illustrating a configuration of a portable image device according to various embodiments of the present disclosure.

FIG. 4 is a block diagram illustrating a configuration of a portable image device according to various embodiments of the present disclosure.

Referring to FIG. 4, the portable image device 400 includes an image capture device 402, an image display device 404, a sensor 406, and a controller 420. In an exemplary embodiment, the portable image device 400 may be portable image device 100 and/or portable image device 200.

The image capture device 402 is configured to capture an image. The image capture device 402 may include one or more cameras such as an infrared camera, an RGB camera, a combination thereof, etc. In an exemplary embodiment, the image capture device 402 includes a lens system and an image sensor, and may further include a flash. The image capture device 402 converts an optical signal input (or captured) through the lens systems into an electrical image signal and outputs the electric image signal to the controller 420. The image capture device 402 may capture a moving object or a still object. In addition, the image capture device 402 may be further configured to detect a motion or gesture.

The image display device 404 is configured to display an image to a user of the portable image device 400. The image display device 404 may be a single display or a plurality of displays configured to display an image to the user. For example, the image display device 404 may be used to display a two-dimensional image and/or a three-dimensional image to the user. For example, the image display device 404 may include at least one of a display panel, a lens, a laser, and a projector to create two-dimensional or three-dimensional images including holograms.

The sensor 406 is configured to detect a state of the portable image device 400 and/or a state of the surrounding environment of the portable image device 400. The sensor 406 may include one or more sensors that detect a state or surrounding environmental condition of the portable image device and transmit a signal indicative of the detection to the controller 420.

The sensor 406 may include at least one of a proximity sensor for detecting the proximity of an object to the portable image device 400, a motion/orientation sensor for detecting a motion or orientation (e.g., rotation, acceleration, deceleration, and vibration) of the portable image device 400, an illumination sensor for detecting ambient illumination in the surrounding environment of the portable image device 400, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor. In addition, the portable image device 400 can include a magnetic ink detection sensor.

In an exemplary embodiment, portable image device 400 may further include at least one of a memory 408, a transceiver 410, an input device 412, an output device 414, and/or a power management device 416.

The memory 408 is configured to store information corresponding to the portable image device 400. The memory 408 includes at least one of a non-transitory computer readable storage medium. In an exemplary embodiment, the memory 408 may include at least one of an external memory device functionally connected with the portable image device 400 and a storage device integrally formed with the portable image device 400 such as a hard drive.

The transceiver 410 is configured to transmit and/or receive signals. In an exemplary embodiment, the transceiver 410 is used to establish communication with one or more devices such as an electronic device or a peripheral/auxiliary device. The transceiver 410 may include one or more devices configured to transmit and/or receive short-range and/or long-range communications. For example, short range communications may include at least one of BLUETOOTH, Infrared Data Association (IrDA), Wi-Fi, Near Field Communication (NFC), etc.

The input device 412 is configured to receive an input. The input device 412 may include one or more different types of input devices. For example, the input device 412 can be a tactile input device such as a button or an audio input device such as a microphone. The input device 412 may include one or more buttons configured to receive an input from the user. In an exemplary embodiment, a user may interact with the input device 412 to turn the portable image device 400 on and off or select and/or search for a menu item or icon.

When the input device 412 includes at least one button, the button can include one or more of a power button, a volume button, a menu button, a home button, a back button, navigation buttons (e.g., left button, right button, up button, down button, etc.), or a combination thereof. In an exemplary embodiment, the input device 412 can further include a keypad to receive a key input from the user to control the portable image device 400. The keypad may be a physical keypad coupled with the portable image device 400, a virtual keypad displayed by a projector of the portable image device 400, or a combination thereof.

When the input device 412 includes a microphone, the microphone generates an electrical signal from a sound wave where the electrical signal indicates an input from the user.

The output device 414 is configured to provide information to the user. For example, the output device 414 may be a speaker configured to output sound to the user or to another party different from the user.

The power management device 416 is configured to manage the power of the portable image device. For example, the power management device 416 may include a power management integrated circuit (PMIC), a charger IC, a battery, and/or a battery gauge. The battery may store or produce electricity to supply power to the portable image device. The battery gauge measures various attributes of the battery. For example, the battery gauge may be configured to measure the remaining capacity, the voltage, the current, and/or the temperature of the battery. In an exemplary embodiment, an indicator associated with the battery status may be displayed on the image display device 404 of the portable image device 400.

The controller 420 is configured to control one or more operations of the portable image device 400. In an exemplary embodiment, the controller 420 is configured to receive a first input from an object detection device such as the image capture device 402 and/or the sensor 406. The first input may indicate that a marker associated with an object is detected by the portable image device 400. The controller 420 determines a configuration of the object based on the first input. For example, in response to detecting a marker associated with an object, such as a simulated portable electronic device, the portable image device 400 can determine a configuration of the object. The configuration of the object can include at least one of a size, shape, orientation, and arrangement. The controller 420 is further configured to generate a first image corresponding to the object based on the configuration and control the image display device 404 to display the first image corresponding to the object. The image displayed on the image display device 404 may correspond to a user interface of another portable electronic device such as a smart phone, a tablet, and/or a wearable device. Based on the configuration of the object, the portable image device 400 may generate and display an image simulating a screen of another type of electronic device.

The image may be selected from one or more user interfaces where each user interface corresponds to at least one of a different type of portable electronic device such as a smart e phone, a tablet, or a wearable device and a different user. The user interfaces may be stored at the portable image device 400 or may be transmitted to the portable image device 400 after the configuration of the object and/or identification of a user is determined.

The user interface may be any type of graphical user interface including screens, menus, icons, alphanumeric characters, symbols, and/or any other visual indicators. For example, after the object is detected, the portable image device 400 may display an image corresponding to a home screen of a portable electronic device including one or more icons associated with applications that may be executed.

In addition, the controller 420 may be further configured to receive an input indicating that a selection associated with the image displayed on the image display device 404 has been made. For example, the selection associated with the image may occur at the object where the controller 420 is configured to determine coordinate values associated with the selection and generate a second image to be displayed on the image display device 404 based on the coordinate values. Alternatively, the selection may detected using the input device 412 of the portable image device 400.

In an exemplary embodiment, the coordinate values of the selection associated with the image displayed on the image display device 404 may be determined based on information provided by the image capture device 402 and/or the sensor 406. For example, the image capture device 402 may capture an image of a selection performed at the object where the location of the selection with respect to the object is used to determine the coordinate values. The coordinate values may then be mapped to a location within the image displayed on the image display device 404 to determine which operation is to be performed based on the selection at the object. After the coordinate values are mapped to a location within the image, the operating system (OS) of the portable image device 400 performs the operation associated with the selection and a second image is displayed on the image display device 404 of the portable image device 400.

Figure 5:
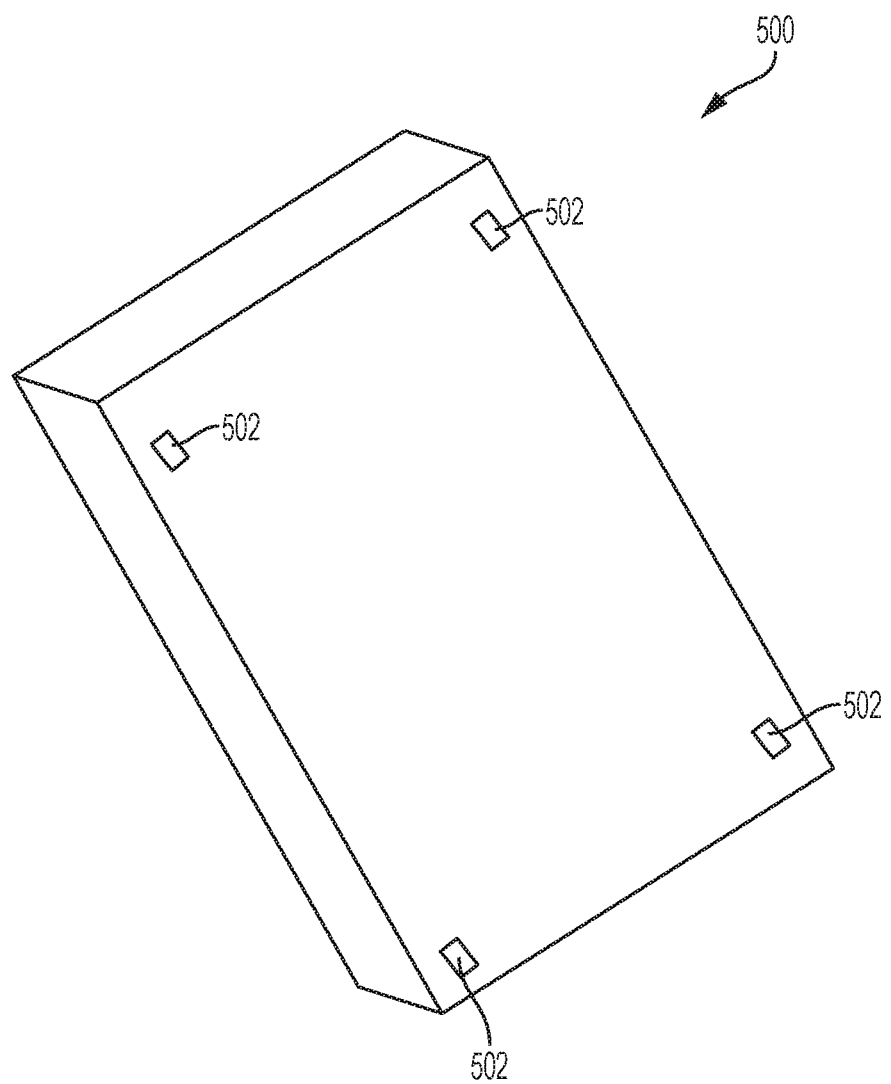
FIG. 5 illustrates an object according to various embodiments of the present disclosure.

FIG. 5 illustrates an object according to various embodiments of the present disclosure.

Referring to FIG. 5, an object 500 is configured to simulate a portable electronic device. The object 500 may allow a user to perceive tactile interaction with a tangible object where the object 400 is merely a simulation, imitation, replica, or reproduction of a portable electronic device. For example, object 500 may have a configuration (e.g., size, shape, weight, mass, texture, etc.) similar to a portable electronic device. However, object 500 lacks any or all electrical components such as a transceiver, a controller, a display, a power supply, etc.

The object 500 may have any size or shape. In an exemplary embodiment, the size of the object 500 may correspond to a type of portable electronic device. For example, the object 500 may be configured to simulate different types of portable electronic devices having different sizes (e.g., wearable devices, mobile devices, tablets, etc.) where a single object 500 corresponds to a single type of portable electronic device. Alternatively, single object 500 may be configured to simulate a plurality of different types of plurality electronic devices.

In addition, the object 500 may have any shape. For example, the object 500 may be rectangular, circular, triangular, etc. The object 500 may also be a sphere, cube, etc. where the object 500 is configured to support three-dimensional positioning and touch feedback.

The object 500 may be manufactured using any type of material including ceramics, composites, glass, metal, polymers, plastics, paper, wood, etc. or a combination thereof. The object 500 may be reusable or disposable. In addition, the object 500 may be rigid or flexible. In an exemplary embodiment, the object 500 may be configured to be stored within the housing of the portable image device where the object 500 is folded or rolled up in order to fit within an opening formed in the housing of the portable image device or a container coupled to the housing of the portable image device.

The object 500 includes one or more markers 502. The markers 502 are configured to allow a portable image device, such as portable image devices 100, 200, and/or 400, to determine and track a location of the object 500 and/or movement of the object 500 with respect to the portable image device. The markers 502 may be any type of mark, guide, symbol, tag, indicator, chip, identifier, etc. For example, markers 502 may be a visual marker or an electrical marker. Visual markers may include any type of optical machine-readable information such as barcodes (including linear, two-dimensional, matrix, and stacked barcodes), alphanumeric characters, symbols, etc. In addition, the markers may also include magnetic ink to allow for magnetic ink character recognition. Electrical markers may include any type of emitter that emits an electrical signal. For example, markers 502 may include one or more infrared (IR) light emitting diodes (LEDs) where the IR LEDs may be self-contained and battery powered.

The markers 502 may be disposed such that the markers are provided on a surface of the object 500, substantially planar with a surface of the object 500, and/or or embedded within the object 500. In addition, while the object 500 is illustrated as having four markers 502 arranged at the corners of the object 500, the object 500 may include any number of markers 502 in any arrangement and/or location of the object 500.

The markers 502 may also be disposed with respect to one or more surfaces of the object 500. For instance, a first set of markers may be arranged on a first side of the object 500 and a second set of markers may be arranged on a second side of the object 500. In an exemplary embodiment, the first set of markers may correspond to a first type of portable electronic device and the second set of markers may correspond to a second type of portable electronic device different from the first electronic device.

The markers 502 allow the object 500 to be detected and identified by a portable image device such as portable image devices 100, 200, and/or 400. However, object 500 may omit the markers and be detected by the portable image device using computer vision based on visual appearance variables associated with the object 500 such as size, shape, color, etc.

Figure 6:
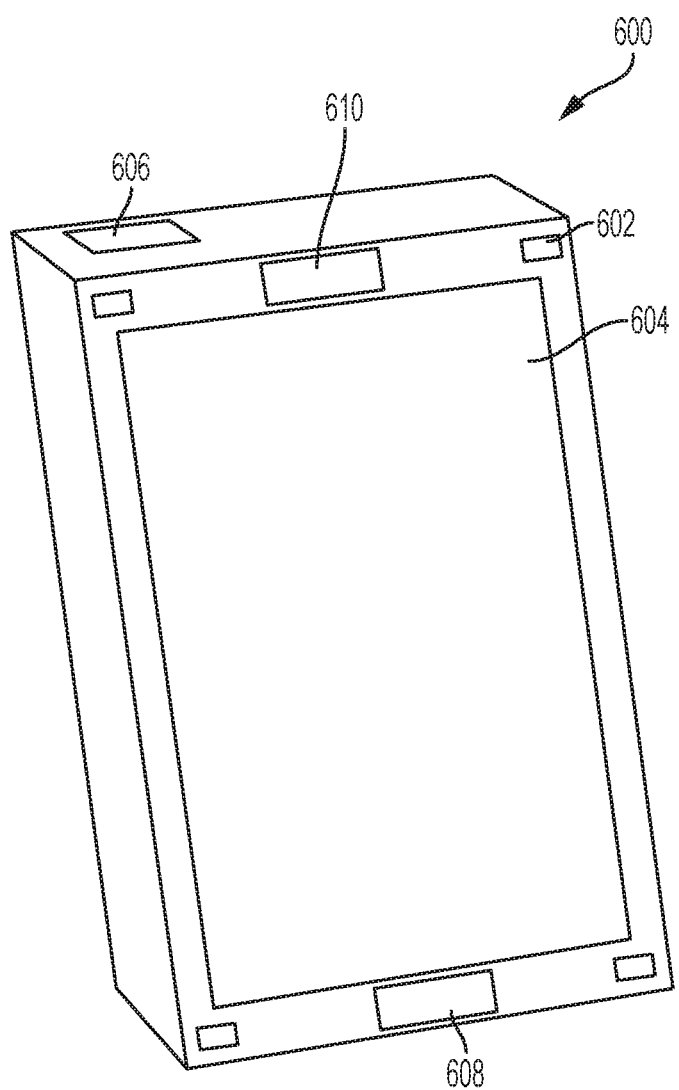
FIG. 6 illustrates another object according to various embodiments of the present disclosure.

FIG. 6 illustrates another object according to various embodiments of the present disclosure.

Referring to FIG. 6, an object 600 is configured to simulate a portable device. Object 600 may have a configuration (e.g., size, shape, weight, mass, texture, etc.) similar to a portable electronic device where the object 600 may further include electrical components to perform a limited number of operations (e.g., less than all operations capable of being performed by a standalone portable electronic device).

The object 600 may have any size or shape. In an exemplary embodiment, the size of the object 600 may correspond to a type of portable electronic device. For example, the object 600 may be configured to simulate different types of portable electronic devices having different sizes (e.g., wearable devices, smart phones, tablets, etc.). In addition, the object 600 may have any shape. For example, the object 600 may be rectangular, circular, triangular, etc. The object 600 may also be a sphere, cube, etc. where the object 600 is configured to support three-dimensional positioning and touch feedback.

The object 600 may be manufactured using any type of material including ceramics, composites, glass, metal, polymers, plastics, paper, wood, etc. or a combination thereof. In an exemplary embodiment, the object 600 may be a repurposed portable device.

The object 600 may include markers 602 and one or more of a transceiver (not illustrated), a display 604, a first input device 606, a second input device 608, and an output device 610.

The object 600 includes one or more markers 602. The markers 602 are configured to allow a portable image device, such as portable image devices 100, 200, and/or 400, to determine and track a location of the object 600 and/or movement of the object 600 with respect to the portable image device. The markers 602 may be any type of mark, guide, symbol, tag, indicator, chip, identifier, etc. For example, markers 602 may be a visual marker or an electrical marker. Visual markers may include any type of optical machine-readable information such as barcodes (including linear, two-dimensional, matrix, and stacked barcodes), alphanumeric characters, symbols, etc. In addition, the markers may also include magnetic ink to allow for magnetic ink character recognition. Electrical markers may include any type of emitter that emits an electrical signal. For example, markers 502 may include one or more infrared (IR) light emitting diodes (LEDs) where the IR LEDs may be self-contained and battery powered.

The markers 602 may be disposed such that the markers are provided on a surface of the object 600, substantially planar with a surface of the object 600, and/or embedded within the object 600. In addition, while the object 600 is illustrated as having four markers 602 arranged at the corners of the object 600, the object 600 may include any number of markers 602 in any arrangement and/or location of the object 600.

The markers 602 may also be disposed with respect to one or more surfaces of the object 600. For instance, a first set of markers may be arranged on a first side of the object 600 and a second set of markers may be arranged on a second side of the object 600. In an exemplary embodiment, the first set of markers may correspond to a first type of portable electronic device and the second set of markers may correspond to a second type of portable electronic device different from the first electronic device.

The markers 602 allow the object 600 to be detected and identified by a portable image device such as portable image devices 100, 200, and/or 400. However, object 600 may omit the markers and be detected by the portable image device based on visual appearance variables associated with the object 600 such as size, shape, color, etc. or signals received from one or more of one or more of the transceiver (not illustrated), the display 604, and the output device 610.

The transceiver (not illustrated) may be configured to transmit and/or receive information. For example, the transceiver may transmit and receive information from a portable image device such as portable image devices 100, 200, and/or 400. In an exemplary embodiment, the transceiver may be a short-range transceiver for short range communications including at least one of BLUETOOTH, IrDA, Wi-Fi, NFC, etc.

The display 604 is configured to display information to a user. The display 604 may be a standalone display configured only to display information as an output device or the display 604 may be a touch screen configured to both receive touch inputs as well as display information.

In an exemplary embodiment, when the display 604 is configured to receive touch inputs, the display 604 is configured to determine the coordinate values associated with a selection made by a user at object 600. The selection may correspond to the image displayed on an image display device of a portable image device. The selection coordinate values are then transmitted to the portable image device via the transceiver.

The first input device 606 and the second input device 608 are configured to receive inputs. The first input device 606 and the second input device may include one or more input devices. In addition, the first input device 606 and the second input device 608 may be the same type of input device or different types of input devices. For example, the input device 606 can be a tactile input device such as a button, selection device, or touch pad and the second input device 608 can be an audio input device such as a microphone.

In an exemplary embodiment, when an input is received at the first input device 606 or the second input device 608, the object 600 can send an indication associated with the input via the transceiver to the portable image device where the portable image device may determine information associated with the input (e.g., selection coordinate values). Alternatively, the first input device 606, the second input device 608, or a controller associated with the object 600 can determine information associated with the input (e.g., selection coordinate values) and transmit the information associated with the input to the portable image device via the transceiver.

The output device 610 is configured to provide information. For example, the output device 610 may be a speaker configured to output sound.

As previously discussed, the object 600 may include one or more of the transceiver (not illustrated), the display 604, the first input device 606, the second input device 608, and the output device 610 where the object 600 is configured to perform a limited number (e.g., less than all) operations conventionally performed by a standalone portable electronic device. Therefore, object 600 may include any combination or configuration of the above elements. For example, the object 600 may include only a tactile touch pad with no screen where the portable image device determines coordinate values of a selection based on an image captured by an image capture device of the portable image device. The object 600 may include a tactile touch pad with no screen and a transceiver where information associated with a detected selection may be transmitted from the object 600 to the portable image device. The object 600 may include a transceiver, a speaker, and a microphone where a traditional phone call may be performed using the object 600 where long range communication transmissions are performed by the portable image device and the information may be transmitted to the object 600 and any input received at the object 600 may be transmitted to the portable image device.

In another exemplary embodiment, an additional input device, such as a stylus, may be implemented with objects 500 or 600. For example, input may be provided at the object 500 or 600 using the stylus. The stylus may be configured to determine information associated with the input and transmit the information to the portable image device or the object 600 when the object 600 includes a transceiver.

Figure 7:
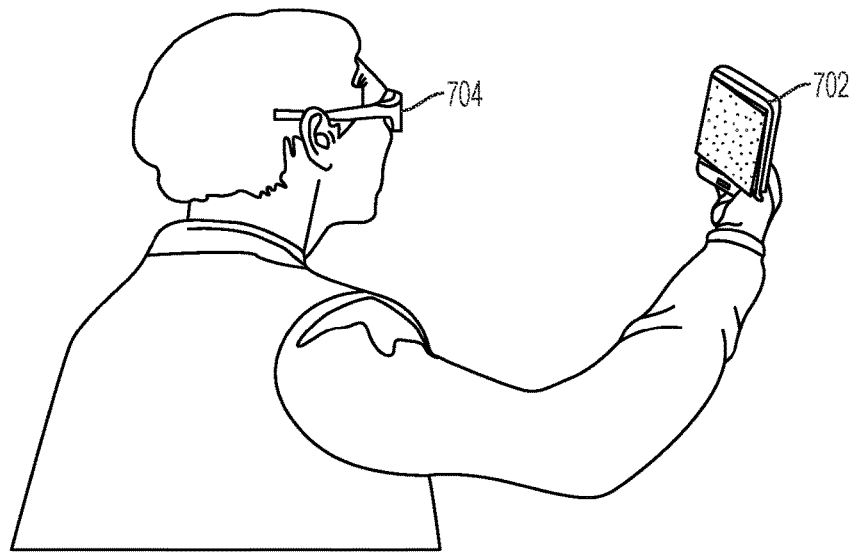
FIG. 7 illustrates a system for displaying an image on a display of a portable image device according to various embodiments of the present disclosure.
Figure 7:
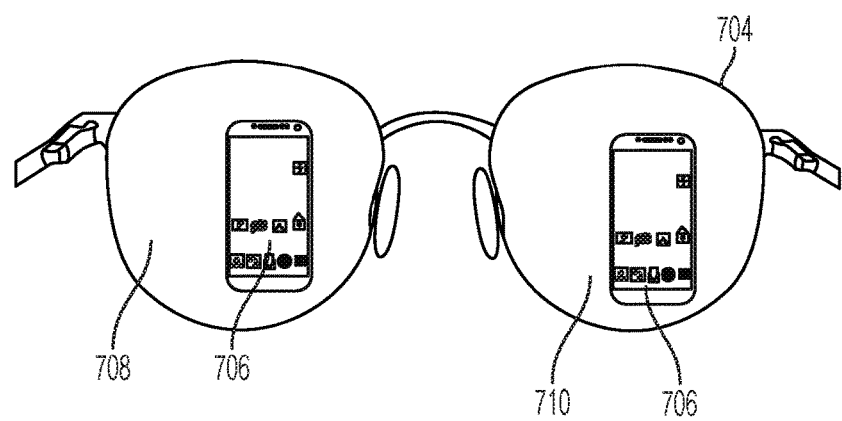

FIG. 7 illustrates a system for displaying an image on a display of a portable image device according to various embodiments of the present disclosure.

Referring to FIG. 7, an object 702, such as object 500 or 600, may come within a predetermined range of a portable image device 704, such a portable image devices 100, 200, and/or 400. After the object 702 is detected by the portable image device 704, the portable image device 704 can display an image 706 on the first display 708 and the second display 710 of the portable image device 704. A user may interact with the image 706 using the object 702. For example, inputs or selections may be made at the object 702 and the portable image device 704 modifies the image 706 to reflect the input or selection.

In an exemplary embodiment, the portable image device 704 may initially display a home screen or a menu as the image 706. The home screen or menu may include various indicators, icons, or text input boxes. When the input or selection provided at the object 702 corresponds with an icon, the portable image device executes the application associated with the icon and displays an application screen on the first display 708 and the second display 710. When the input or selection provided at the object 702 corresponds to a text input box, the portable image device may display a virtual keyboard on the first display and the second display 710 where the user provide further inputs associated with key selection to generate alphanumeric characters or symbols.

It is noted that while an initial input interaction is described, the portable image device 704 is configured to allow a user to interact with the user interface using the object 702 in the same way a user would traditionally interact with a user interface of an electronic device. For example, the portable image device 704 uses the same OS as other electronic devices. The portable image device 704 may select an OS after determining a type of electronic device associated with the object 702. As illustrated in FIG. 7, it is determined that object 702 corresponds to a smart phone. The portable image device 702 translates the coordinate values of a selection performed at the object 702 and generates a request or system call as if the selection was performed at the smart phone. The OS interactions remain unchanged where the kernel cannot differentiate a request or system call received at the object 702 from a request or system call received at an electronic device. In other words, the portable image device 704 modifies the input provided at the object 702 such that the input provided at the object 702 is received by kernel of the OS in the same format as a request or system call corresponding to the same type of input received at the smart phone.

In an exemplary embodiment, when the object 702 is within the field of view of the portable image device 704, the image 706 may be projected on the first display 708 and the second display 710 to simulate the appearance that the image is generated at the object 702. The portable image device 704 may use markers and/or other visual attributes of the object 702 to recognize and track the location of the object 702 with respect to the portable image device 704. In an exemplary embodiment, when the object 702 is moved within the field of view of the first display 708 and the second display 710, the location of the image 706 on the first display 708 and the second display 710 also dynamically move such that the image 706 maintains the appearance of being displayed at the object 702 rather than the portable image device 704.

In another exemplary embodiment, the portable image device 704 may verify a user prior to displaying the image 706 on the first display 708 and the second display 710. For example, an identity of a user may be determined and/or verified using various techniques including retina scans, etc. The image 706 and configuration of the user interface may be selected based on the identity of the user and/or a type of electronic device corresponding to the object 702. Alternatively or additionally, if the object 702 includes markers, the markers may include information associated with a user and/or desired configuration of the user interface. In addition, the portable image device 704 may be configured to support a plurality of different users and/or a plurality of different objects 702.

Figure 8:
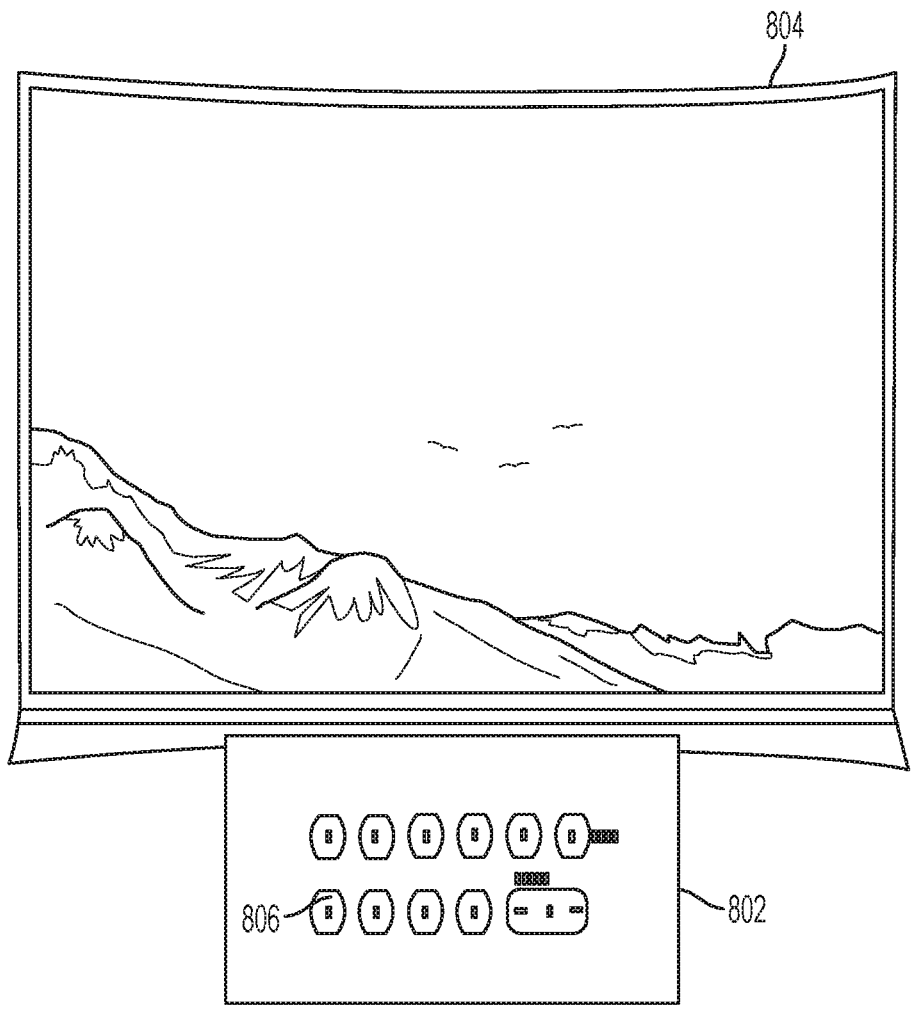
FIG. 8 illustrates another system for displaying an image on a display of a portable image device according to various embodiments of the present disclosure.

FIG. 8 illustrates another system for displaying an image on a display of a portable image device according to various embodiments of the present disclosure.

Referring to FIG. 8, a portable image device may detect an object 802 and an image 804 may be displayed within a predetermined distance of the object 802. For example, rather than an image substantially overlapping a detected object in a field of view of the display of the portable image device as previously discussed, the image 804 is displayed on the display of the portable image device such that the image 804 appears above the object 802 in FIG. 8. However, the image 804 may be displayed at any location with respect to the object. In addition, the image 804 may partially overlap the object 802 or be displayed to be separated from the object 802 by a predetermined distance.

In an exemplary embodiment, object 802 may include input devices 806 to receive inputs provided at the object 802 associated with the image 804.

Alternatively, the portable image device may generate the image 804 to include virtual input indicators to be superimposed over the object 802 in the user's field of view.

The object 802 may correspond to any type of electronic device. As illustrated in FIG. 8, the object 802 may correspond to an electronic device such as a television. When the object 802 corresponds to a television, additional complex user interface effects may be implemented by the portable image device such as incorporating three-dimensional images, etc. Alternatively, the object 802 may correspond to a digital thermostat where a user can modify a temperature by providing a selection or input at the object 802. In addition, the object 802 may be used as a simulated article or prop. For example, the object 802 may have a shape similar to a crossbow and when the object 802 is detected by the portable image device, an arrow is displayed to appear as if it is mounted on the crossbow. Alternatively, the portable image device may generate an image of a blade or beam so that the object 802 appears to be a sword or a fictional energy weapon.

In other exemplary embodiment, the portable image device may detect an object associated with another user. For example, the portable image device may detect a first object associated with the user of the portable image device and a second object associated with another person. The portable image device may display images associated with both the first object and the second object.

Figure 9:
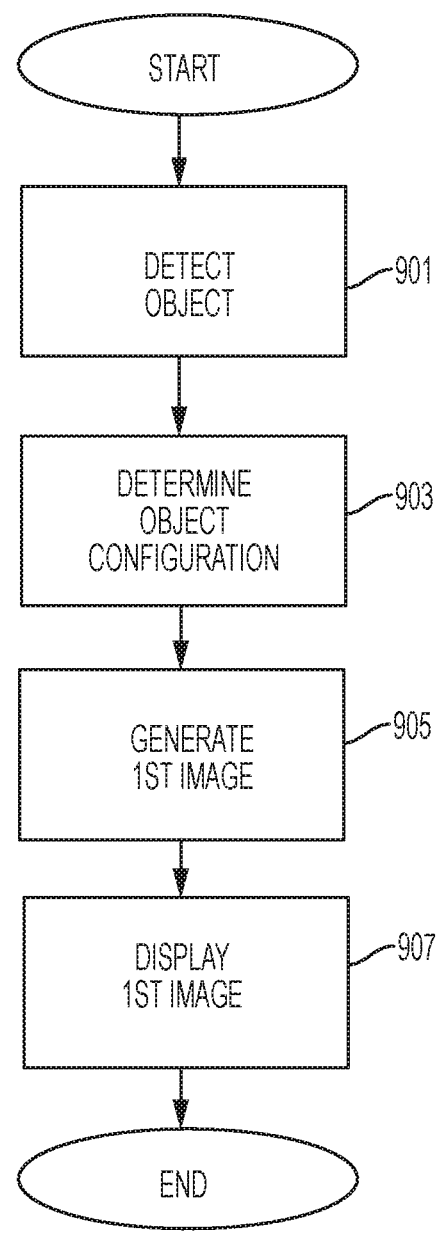
FIG. 9 is a flow chart illustrating a method of displaying an image on a display of a portable image device according to various embodiments of the present disclosure.
Figure 10:
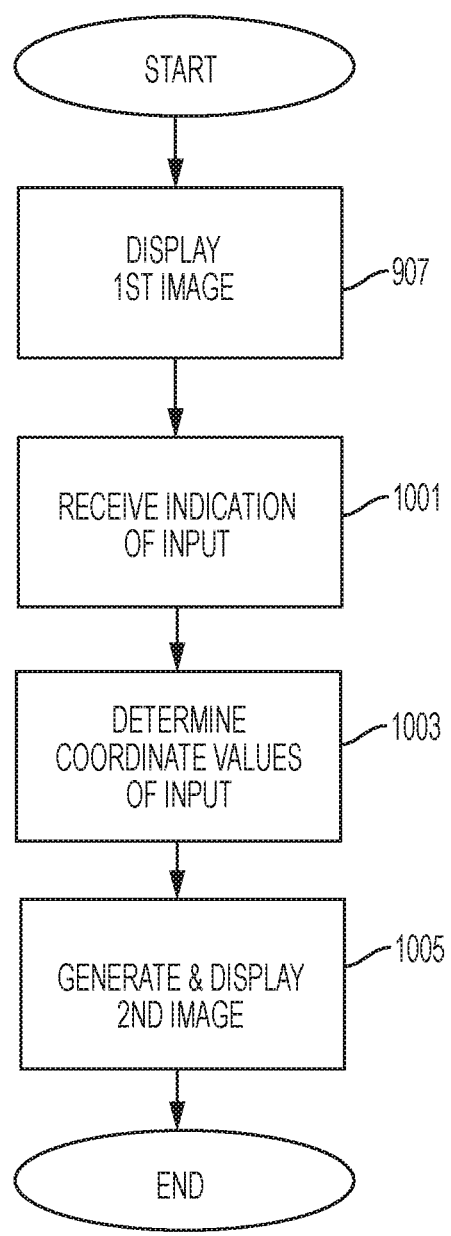
FIG. 10 is a flow chart illustrating another method of displaying according to various embodiments of the present disclosure.

FIGS. 9 and 10 are flow charts illustrating a method of displaying an image on a display of a portable image device according to various embodiments of the present disclosure. The method will be discussed with reference to exemplary portable image device 400 illustrated in FIG. 4. However, the method can be implemented with any suitable portable image device. In addition, although FIGS. 9 and 10 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 9, at operation 901, an object is detected within a predetermined distance of a portable image device. For example, an object, such as object 500 or 600, may be detected using the image capture device 402 and/or the sensor 406 of the portable image device 400. The detection of the object may be based on markers associated with the object or visual characteristics of the object. Alternatively, the object may emit a signal where the portable image device 400 detects the signal.

In an exemplary embodiment, the object may be flexible where the object may be folded or rolled up. In addition, the object may include a modular design where separate components may be selected and plugged into the object. For example, the object may include knobs, buttons, screens, etc. The modular object may transmit information to the portable image device 400 to indicate which components are present and the location, the capabilities, the size, the shape, etc. of each component. Marker segments may be separated from each other based on the components where the portable image device 400 maintains the projected image based on the new modular configuration. In addition, the markers may provide information to the portable image device 400 indicating which gestures or inputs the object may detected. For example, applications may modify configurations based on the object configuration and layout.

At operation 903, a configuration of the object may be determined. For example, the portable image device 400 may determine at least one of a size, a shape, an orientation, and/or an arrangement of the object in order to determine a type of electrical device which the object is to simulate such as a smart phone, a table, and/or a wearable device. The portable image device 400 may determine the configuration of the object based on the size, shape, orientation, and/or arrangement of the object and/or markers provided at the object. If markers are provided at the object, the markers may include at least one of a visual marker and/or an electrical marker. The configuration of the object may further be based on an identification of the user of the portable display device 400.

At operation 905, a first image may be generated to correspond to the object. For example, the portable display device 400 may generate the first image based on the configuration of the object. The first image may be selected from a plurality of user interfaces stored at the portable display device 400.

At operation 907, the first image may be displayed on the image display device. For example, the first image may be displayed on the image display device 404 of the portable image device 400. In an exemplary embodiment, the portable image device 400 determines the location of the object and displays the first image based on the location of the object. For example, the first image is displayed on the image display device 404 to simulate that the image is being displayed by the object where the portable image device 400 tracks the movement of the object with respect to the portable image device 400 such that the position of the first image dynamically changes with the movement of the object.

Referring to FIG. 10, at operation 1001, an indication that a selection has been made at the object is received. For example, the portable image device 400 receives an indication that an input has been provided at the object. The input corresponds to the first image displayed on the image display device.

In an exemplary embodiment, the portable image device 400 receives the indication that the input has been provided from the image capture device 402 and/or the sensor 406. Alternatively, when the object includes a transceiver, the portable image device 400 receives the indication that the input has been provided from the object.

At operation 1003, coordinate values associated with the selection are determined. For example, the portable image device 400 determines the coordinate values of the selection made at the object. The coordinate values may be used to determine an item selected by the user where the coordinate values of the selection are mapped to the image displayed on the image display device 404.

At operation 1005, a second image is generated and displayed. For example, the portable image device 400 generates the second image based on the coordinate values. For example, if the coordinate values correspond to an icon displayed on the first image, the portable image device 400 translates the coordinate values and transmits the appropriate event to the OS of the portable image device. The OS passes the even to the application associated with the icon and executes the application to display an application screen on the portable image device 400.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A portable image device comprising:
an object detection device;
an image display device; and
at least one processor configured to:
receive a first input from the object detection device, the first input comprising an indication that an object having a plurality of visual markers corresponding to an electronic device, the plurality of markers being disposed on a surface of the object, and at least one of a size or a shape corresponding to the electronic device is detected,
determine a configuration of the object based on the first input,
generate a first image of the electronic device corresponding to the configuration of the object,
display the first image on the image display device to simulate the electronic device on the object, the first image comprising a user interface of the electronic device,
receive a second input from the object detection device,
determine a selection at the user interface of the electronic device based on the second input,
determine an executable operation associated with the electronic device based on the selection, and
execute the determined executable operation.

2. The device of claim 1,
wherein the at least one processor is further configured to:
determine coordinate values of the second input,
generate a second image of the electronic device based on the coordinate values of the second input and the executable operation, and
display the second image on the image display device.

3. The device of claim 1, wherein the object detection device is configured to:
receive information from the object,
generate the second input based on the received information, and
provide the second input to the at least one processor.

4. The device of claim 1, further comprising:
a proximity sensor,
wherein the at least one processor is further configured to:
receive, from the proximity sensor, proximity information corresponding to the object,
determine a location of the object based on the received proximity information, and
display the first image based on the location of the object.

5. The device of claim 1, wherein the object detection device is at least one of an image capture device or a sensor.

6. The device of claim 1, further comprising:
a memory configured to store a plurality of electronic device user interfaces,
wherein the plurality of electronic device user interfaces comprises the first image.

7. A method of displaying an image on a portable image device, the method comprising:
receiving, by the portable image device, a first input from an object detection device of the portable image device, the first input comprising an indication that an object having a plurality of visual markers corresponding to an electronic device, the plurality of markers being disposed on a surface of the object, and at least one of a size or a shape corresponding to the electronic device is detected;
determining, by the portable image device, a configuration of the object based on the first input;
generating, by the portable image device, a first image of the electronic device corresponding to the configuration of the object;
displaying, by the portable image device, the first image on an image display device of the portable image device to simulate the electronic device on the object, the first image comprising a user interface of the electronic device,
determining, by the portable image device, a selection at the user interface of the electronic device based on the second input,
determining, by the portable image device, an executable operation associated with the electronic device based on the selection, and
executing, by the portable image device, the determined executable operation.

8. The method of claim 7, further comprising:
determining coordinate values of the second input;
generating a second image of the electronic device based on coordinates values of the second input and the executable operation; and
displaying the second image on the image display device of the portable image device.

9. The method of claim 7, wherein the receiving of the second input from the object detection device comprises:
receiving, by the object detection device, information from the object,
generating, by the object detection device, the second input based on the received information, and
providing, by the object detection device, the second input to the at least one processor.

10. The method of claim 7, further comprising:
receiving, from a proximity sensor, proximity information corresponding to the object;
determining a location of the object based on the received proximity information; and
displaying the first image based on the location of the object.

11. The method of claim 7, wherein the object detection device is at least one of an image capture device or a sensor.

12. The method of claim 7, wherein the generating of the first image comprises retrieving, from a memory of the portable image device, the first image from a plurality of electronic device user interfaces.

* * * * *